United States Patent [19]

Gasser et al.

[11] 3,976,804

[45] Aug. 24, 1976

[54] POWDERED TEA PRODUCT AND PROCESS FOR PRODUCTION

[75] Inventors: Rupert J. Gasser, Old Greenwich, Conn.; James G. Franklin, Marysville, Ohio

[73] Assignee: Societe d'Assistance Technique pour Produits Nestle S.A., Lausanne, Switzerland

[22] Filed: Oct. 21, 1974

[21] Appl. No.: 516,354

[52] U.S. Cl. .................................. 426/597; 159/49
[51] Int. Cl.² .......................................... A23F 3/00
[58] Field of Search .......... 426/142, 193, 435, 597; 159/49

[56] References Cited
UNITED STATES PATENTS 3,222,182  12/1965  Henderson et al. ............. 159/49 R Primary Examiner—Joseph M. Golian
Attorney, Agent, or Firm—Watson Leavenworth Kelton & Taggart

[57] ABSTRACT

Dried tea flakes are prepared by vacuum drum drying. A tea extract having a solids content of 40 to 55% is applied to a drum in a film having a thickness of up to 0.09 centimeters. The drum is maintained at an internal temperature of 95° to 125°C. Water is evaporated from the film under vacuum of 3 to 15 Tor or in 10 to 150 seconds to result in dried product having an apparent density of less than 12 grams per 100cc.

13 Claims, 2 Drawing Figures

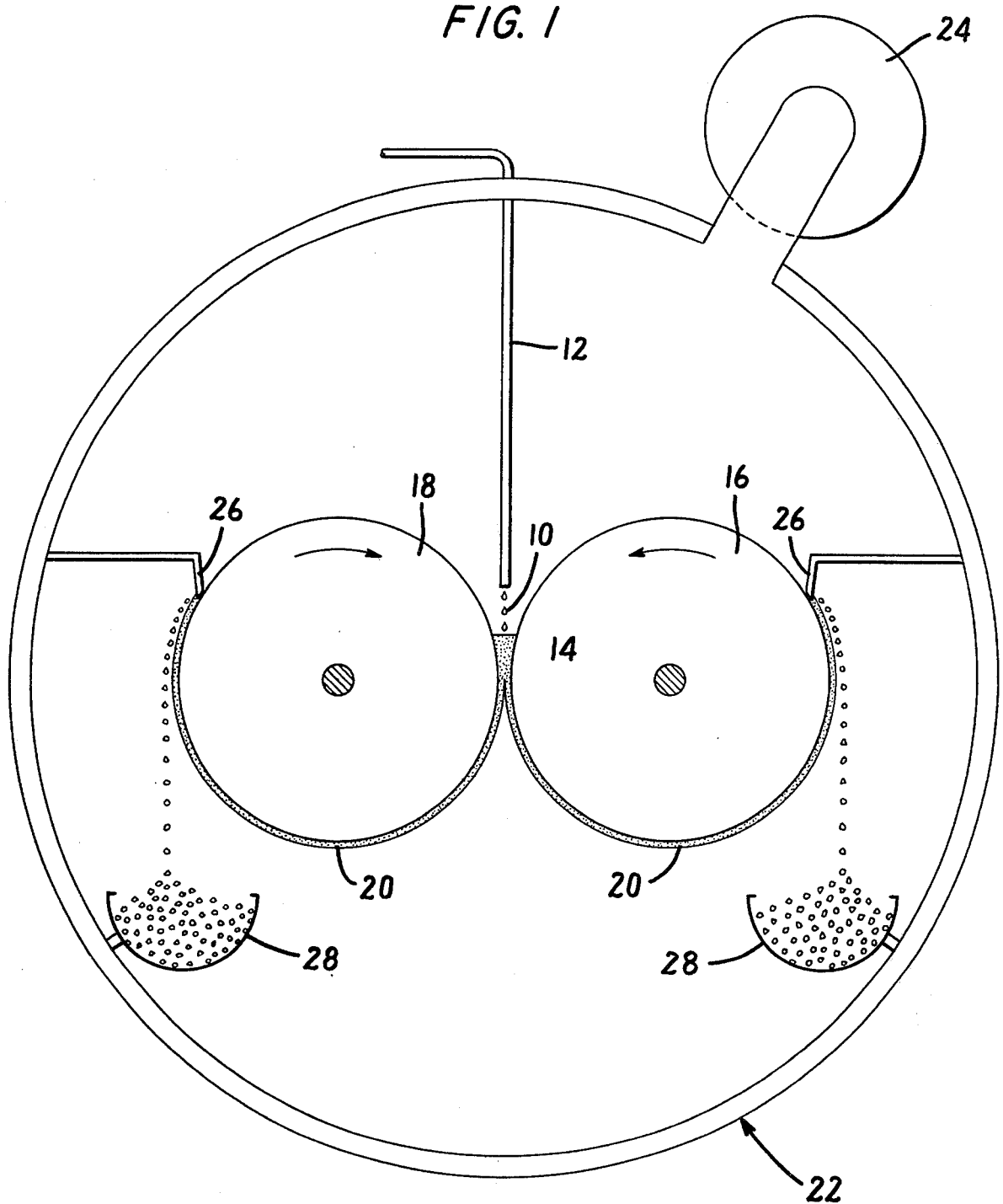

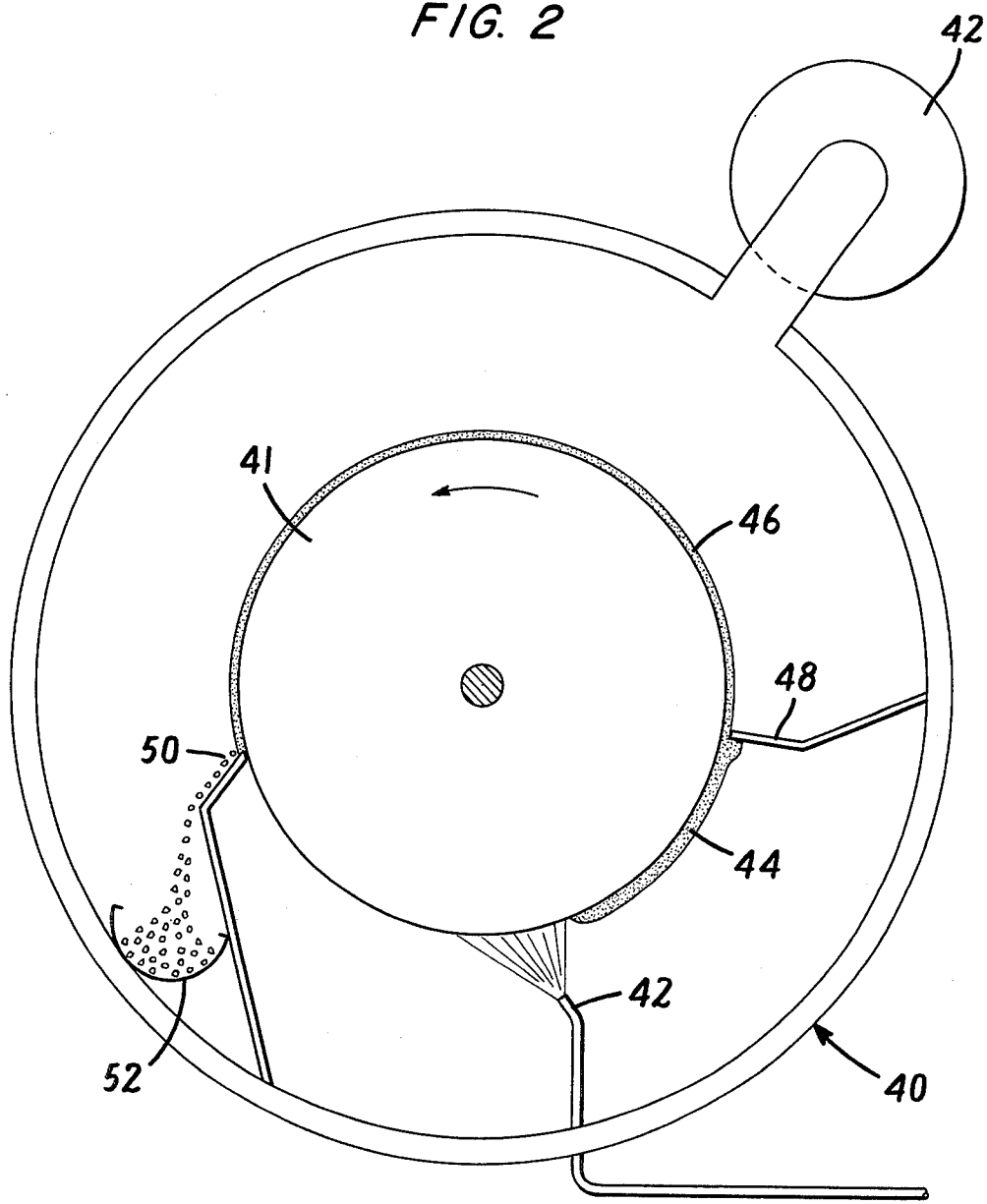

POWDERED TEA PRODUCT AND PROCESS FOR PRODUCTION

DESCRIPTION OF THE INVENTION

In accordance with the present invention, tea extracts are dehydrated by vacuum drum drying under carefully controlled conditions to produce a solid tea product having improved appearance and organoleptic properties.

The present dehydration technique utilizes one or more internally heated, rotating drums which are disposed within an air-tight vacuum casing. A thin film of tea extract is applied to the surface of a rotating drum and while thereon is dried under conditions involving subjecting the film to the influence of both heat and vacuum. After the extract has dried, and while still on the drum, the adherent solid tea is brought into contact with a shearing device for removing the tea from the drum surface in flakes or leaf-like forms, such device concurrently cleaning the drum surface for further application, and dehydration, of tea extract.

Any of the commercially available forms of vacuum drum driers may be utilized in the practice of the present invention.

As is known by those skilled in the art, a vacuum drum drier generally includes an outer, air-tight housing or casing in which can be maintained a condition of vacuum suitable for dehydration. Disposed within the casing are one or more, usually two, rotatable, cylindrical drums adapted to be heated to a desired dehydration temperature. Where multiple drums are employed, they should be located in parallel on a horizontal plane for rotation about horizontal axes and in opposite or counterrotation directions. Further, the axes should be spaced such as to provide that a small clearance distance or nip exists between the surfaces of the drums, the nearest point of approach of their rotating surfaces being approximately twice the thickness of the film of tea extract which is to be dried. Further, the drier should be provided with means for feeding the extract onto the drums, as well as means such as a scraper device for removing the dried tea product therefrom.

The means for applying the film of extract to the drum surface can comprise any of those known in the art. Thus, for example, where twin horizontal drums are utilized and are opposingly rotated in a downward direction at their nip, the trough which is formed therebetween along the length of the drums above the nip may simply be fitted with closure means at both ends and filled with tea extract to a depth of up to a small fraction—usually less than about 10%—of the radius of the drums. In this manner, and as the drums turn, tea extract is accurately metered onto the drum surface and doctored to a desired film thickness—as limited by the smallest clearance distance between the two drums—over the lower surface of each of the drums.

Further, by way of example, where the drums are rotated in a manner opposite to the above—i.e. in such manner as to be rotated in an upward direction at the drum clearance or nip—the tea extract can be sprayed onto the lower surfaces of the drums or the drums may be caused to pass through a bath of tea extract so as to provide a coating of tea extract thereon. Thereafter, the coating of extract on the drum surfaces is spread or doctored to the desired film thickness as the coating passes through the nip between the two drums.

These latter techniques are not, however, as readily susceptible to close control in processing as is the trough feed method which is preferred. Spraying the extract onto a drum presents special difficulties in respect of producing an even, thin film thickness. As for bath applications, the requirement that considerable amounts of extract be subjected to very low pressure for considerable periods of time in the pool is also detrimental. Partial drying of the extract under such conditions disturbs the close control of processing conditions required by the present invention.

The invention will be further understood with reference to the accompanying drawings in which FIG. 1 is a generally schematic depiction of a drum drier unit in which two drying drums are disposed in an air-tight casing, the extract being applied to the drums as a film thereof from a pool of extract formed at the nip of the drums.

FIG. 2 is a schematic depiction of a drum drier unit in which the extract is applied to the drum in a spraying operation.

Referring now to FIG. 1, tea extract 10 is fed through line 12 from a suitable source and is monitored into the drier outleting from line 12 so as to form a pool 14 of extract in a trough defined by and between the two internally heated drums 16, 18. As the drums 16, 18 rotate past the nip therebetween and in the indicated direction, films 20 of the extract are applied to and doctored onto the drum surfaces. The speed of drum rotation is controlled to provide a film residence time thereon sufficient to effect drying the film—under the prevailing drum temperature and the pressure condition established within chamber wall 22, the condition of vacuum being maintained by vacuum pump 24, the dried film thereafter being removed from the drums by the stationary doctor blades 26. The dried product particles—e.g., flakes of dried tea removed by the doctor blades—then drop into and are collected in storage receptacles 28 which are emptied as desired—e.g., with respect to a continuous operation, through an air lock, so that the operating level of vacuum within the chamber is maintained.

Where the drier unit employs only a single drum as shown in FIG. 2, application of extract to the drum surface can be accomplished in a spraying operation or from a bath as previously indicated. In such instances the desired extract film is ordinarily obtained through the use of a doctoring means, such as a bar or like spreader, which is positioned with a small clearance from the drier drum and parallel to the surface thereof so as to monitor the thickness of the film to within desired parameters. In an advantageous embodiment of a single drying drum system, the doctoring means could be a second but considerably smaller rotatable cylinder which permits trough feeding and doctoring by the preferred techniques indicated above.

FIG. 2 depicts a suitable single drum drier which operates in much the same manner as previously described with respect to FIG. 1. Again, a hollow vacuum chamber defined by a wall 40 is provided, to which is connected a suitable vacuum pump 42. In this case, however, the extract is applied to the drum 41 from a spray unit 42 to form a relatively thick coating of extract 44 which is doctored to a relatively thinner film 46 of a desired thickness only after passing a spreader unit 48. In this embodiment, the drying residence time is measured as the time required for revolution of a point on the drum from such spreader unit 48 to the shearing means or doctor knife 50. Again a receptacle 52 is provided for collecting the product tea flakes.

In order to maximize control of the present processing conditions—as well as to avoid mechanical and other difficulties—it is desirable that fluid internal heating of drums be utilized. Accordingly, hollow-walled drums having wall dimensions limited only by the pressure they must withstand in the vacuum chamber are preferred.

Where, in accordance with a still further preferred embodiment of the present invention, the drums are hollow and heated with a gas—usually steam—having a liquid/gas phase transition at about, or preferably within, the temperature range used for drying. This property is highly beneficial to the process because as the injected heating gas gives off heat energy to the drum, and thus is cooled and condensed, its latent heat of vaporization becomes available directly at the interior surface of a drum to prevent the uneven heating effects which would result if only the flow of additional heating fluid to such surface were relied upon for control of the drying temperature.

Although, as noted above, the vacuum drum driers which can be utilized in accordance with the present process are completely conventional, the conditions for operation of such devices are not. The present invention is founded on the discovery that, pursuant to dehydration performed within several narrow and precisely controlled processing parameters, a unique and highly desirable powdered tea product is produced.

This tea product of the present invention preferably has a total moisture content of between 2 to 4% by total weight and an apparent density of between about 6 and 10 grams per 100 cc. To such extent, the present powdered extract has qualities which have long been sought in the art. Particularly, the former provides good storage capability and retention of volatiles, and the latter, convenience to the ultimate consumer who ordinarily desires a density such that a single teaspoon of powdered tea will suffice for the production—upon reconstitution with water—of a cup of tea beverage.

In addition to the foregoing properties of the tea powder, the present product is also provided with a considerably enhanced appearance and exhibits significantly improved organoleptic properties. Both of these further characteristics, and particularly in combination with the previously indicated density and moisture parameters, are unique.

Unlike the hollow expanded spheroids produced pursuant to spray drying, the granules resultant from freeze drying and the other physical forms in which dried tea products have been produced in the past, the present product is provided with a flake or leaf-like structure not heretofore available. These flakes or leaf-like structures resemble the physical shape of tea leaves and thus provide an appealing appearance to the consumer.

Additionally, the present products are unusually glossy, brown and thus rich in appearance. Further, these flakes are of an essentially non-porous character, thus providing an almost vitreous appearance to the dried product. Accordingly, and in contrast to the porosity and dull, pale tan of commercially available tea products such as spray dried tea, the present product exhibits an appearance which is unusually desirable.

Further, upon reconstitution with water to beverage form, the present tea products yield a reddish-orange—or "bright" as it is known in the art—appearance to the beverage which is imitative of that of a beverage prepared directly from tea leaves. Again, this desirable beverage appearance has long been sought in the art and contrasts vividly with the washed-out grayish—or "dull" as it is known in the art—appearance which is obtained from prior art "instant" teas, such as spray dried tea powders.

Moreover, the "bright," as opposed to "dull," appearance of reconstituted products of the present invention is known to be indicative of successful avoidance of the heat damage common to prior art products. Thus, as might be expected from such indication, the products of this invention have been discovered to exhibit a higher retention of native tea constituents—as compared with prior art "instant" teas—and consequently provide enhanced and natural flavor and aroma.

The foregoing attributes of the present dried tea products are dependent upon utilization of vacuum drum drying performed within the narrow limitations of a number of separate, but dependent, processing parameters. More particularly, products of the present invention may be produced only where the concentration of the tea extract feed to the drum drier, the drying temperature, the thickness of the film of extract to be dried, the residence drying time of extract on the drum and the vacuum of drying are all carefully balanced.

In accordance with the present invention, it is necessary that the tea extract being fed to the vacuum drum drier have a concentration of between about 40 to 55%, preferably about 45 to 50%, of total solids by weight. The maximum for this feed concentration parameter generally will be limited by the quality of extract distribution on the drum surface. Thus, if the concentration is such that poor distribution characteristics are produced, the concentration will be unsatisfactory inasmuch as improper distribution results in uneven drying in the tea product as well as a decrease in the rate at which the extract is dried. Conversely, concentrations below the indicated range yield a product of increased density as well as one which is unusually fine in texture and thus fail to provide the desired flakes or leaf-like structure.

Such a solid concentration is considerably above the 1.0 to 10% solids concentration normally achieved through aqueous extraction of tea leaves. Consequently, the initial extract is preconcentrated to achieve the indicated solids concentration necessary for drying. Although preconcentration may be performed by any suitable means known in the prior art, it is desirably performed under conditions which do not permit heat damage or extract flavor. Consequently, it is preferred that the original extract be preconcentrated to the indicated feed concentration by a technique such as low temperature vacuum evaporation which minimizes exposure or extract to higher temperatures.

Such a low temperature preconcentration technique yields the additional advantage that the feed extract is then readily available for drying without the necessity of cooling to provide it at the ambient temperatures (from about 20° to 30°C) which are preferred. The feed extract may be admitted to the driers at higher temperatures of, for example, up to about 40° to 60°C, or may even separately be preheated to such temperature prior to application onto the drum surface. At such higher temperatures, however, care must be taken to avoid flash vaporization of the extracts at the low pressures to which they are thus exposed. Accordingly, ambient temperature feed extracts, which thus are brought to the higher temperatures necessary for significant dehydration only upon contact with the heated drum surfaces, are preferred.

It is also preferred that the extract be stripped of volatiles prior to drying. This step—which may be performed by passing steam through the extract or by other conventional techniques—avoids loss of valuable flavor and odor constituents during drying. These volatile constituents may then later be recombined with the dried tea to produce a full flavored product.

We have found that the temperature at which the present feed extracts should be dried advantageously can be controlled by maintaining an internal drum temperature of between about 95° to 125°C, preferably about 100° to 115°C. "Internal drum temperature" is intended to denote the temperature of that portion of the drum just sufficiently interior of the drying surface as to be substantially unaffected by the evaporative cooling of the extract film occurring on the drum outer surface. Close and precise control of the temperature is very important inasmuch as temperatures higher than those set forth will result in over-drying of the tea product and possible heat damage thereto. Also, lower temperatures result in higher product moisture contents which may render the teas less stable during storage.

Such control is desirably obtained through the previously described thin walled hollow drums internally heated with a fluid such as steam. In such a preferred embodiment, the "internal drum temperature" and the temperature of the heating fluid are substantially the same.

The thickness of the film of extract which is subjected to dehydration on the drum surface should be within the range of from about 0.09 cm. down to the thinnest uniformly distributed film that can be retained on the rotating drum surface. Preferably, these film thicknesses lie within the range of from about 0.065 to about .005 cm. Where film thicknesses above the indicated range are utilized, the extract will tend to flow upon the surface of the drum, thus resulting in uneven distribution of extract thereon and loss of control over the moisture content of the product, or extract may even fall from the drum.

After a film of the foregoing thickness has been doctored on the drum and incident to drying thereof some expansion will occur incident to dehydration. Within the context of the present invention, however, such expansion is normal and expected. Thus, it is not detrimental to the desired results of the present invention which will be produced so long as a thickness within the indicated parameters is achieved preparatory to measuring the residence time of the film on the drum—i.e., at the time of doctoring of extract on the drum.

An extract film of the above-indicated thickness must be subjected to dehydration over residence time of from about 10 to about 150 seconds, preferably, from about 10 to 100 seconds (the residence time being measured as the period beginning when the extract is doctored to the above-indicated thickness and ending when the dried product is removed from the drum surface). Longer residence times result in over-drying of the tea product and the undesirable production of fines instead of the desired flake or leaf-like structures. At shorter residence times, the tea product may exhibit an excess moisture content and unduly coarse particle formation.

Finally, the vacuum to which the extract should be subjected incident to dehydration will preferably be within the range of from about 3 to 15 Tor. Where a lower pressure (or greater degree of vacuum) is utilized, the tea extract will tend to freeze on the drum, thus providing considerable difficulties in obtaining the desired degree of dehydration as well as giving rise to possible mechanical problems. Higher pressures (or lesser degrees of vacuum) may give rise to condensation of evaporated water on the internal surfaces of the drier and vacuum chamber walls. Such condensation which, in addition to the mechanical difficulties incident thereto, may through drippage result in an undesirable moisture variation in the tea product should obviously be avoided.

To some extent, the disadvantages of higher pressures during dehydration may, however, be overcome through the expedient of heating the entire drier—for example by steam jacketing the casing wall of the vacuum chamber so as to maintain the temperature of its inner surface sufficiently high to prevent condensation. In this manner, the range of operation of vacuum drum drying may be extended up to 50 Tor, 1000Tor, and even higher, without adverse effect upon the process or the quality of product produced thereby.

In selecting particular operating conditions within the parameters already set forth, it has further been discovered that the optimization of results may require a balancing of the various individual conditions. Thus, where an extreme value within one such parameter range is chosen, it is ordinarily desirable that a corresponding, compensating extreme of at least one other parameter also be utilized.

This preferred utilization of conditions of optimum compatibility may be exemplified through the relationship between residence time and film thickness of extract during dehydration. Optimal conditions within the particularly broad permissable ranges of these parameters are obtained when such times and thicknesses are selected in direct ratio. For example, minimum times and thicknesses or maximum times and thicknesses are ordinarily utilized together such that any given time and thickness ratio is within the ratio of from 500 sec/cm to 5,000 sec/cm, most preferably from 1,000 sec/cm to 3,000 sec/cm. Similar relationships for optimalization of results exist between each of the other pairs of conditions within the scope of the present invention, although the degrees to which they influence the dried product are generally considerably less apparent.

In addition to the discovery that operation of the present invention in accordance with the above-indicated parameters results in a highly desirable product, it has been found that further specification of such parameters may permit the accentuation of desirable characteristics of the resultant instant tea product. Particularly, it has been found that the residence time, vacuum, and film thickness can further be controlled to effect the production of products which possess properties of particular local preference of appearance.

Dried tea flakes of maximum size, or coarseness, and of the darkest, richest brown color are produced where a film thickness within the range of from about 0.035 to 0.065 cm. is dried. In accordance with the general relationship found to exist between residence time, vacuum and film thickness, the drying of extract of such thickness should be performed with residence times and degrees of vacuum at the higher ends of the conditions within the scope of the present invention. Thus, such a film should ordinarily be dried over a residence time of from about 40 to 100 seconds and at a pressure of from about 3 to 10 Tor.

Products produced in accordance with this preferred embodiment of the present invention ordinarily are obtained as relatively large, coarse flakes. In a still further preferred embodiment these flakes may then be subjected to comminution—e.g. by sieving to particles of the smaller dimension to which consumers are generally accustomed—to render them more readily acceptable for use.

Where, on the other hand, it is desired to provide a dried tea product of lighter brown hue, it has been found that one should dry a film having a thickness within the range of from about 0.007 to 0.025 cm., at a pressure of from about 10 to 15 Tor over residence time of from about 10 to 40 seconds. In accordance with this second preferred embodiment of the present invention, the dimensions of the resultant flakes do not, however, benefit from comminution as they are ordinarily produced in sizes to which consumers have long been accustomed.

As previously indicated, it is preferred that the density of the present product be between 6 and 10 grams per 100 cc. immediately after being sheared from the drying drum. This is not, however, the density which the product desirably possesses when in the hands of the ultimate consumer and which permits a single teaspoonful to be reconstituted with water into a cup of suitable tea beverage. To be reconstitutable in such measure, the dry tea should have a density of from about 9 to 12, preferably about 10 to 11 grams per 100 cc. (10g/100cc is most preferred by United States consumers and upwards of about 11g/100cc, by many foreign consumers).

This difference between immediate and ultimate density is accounted for by the present invention, however, as there is no difficulty in raising the density of the present products. Indeed, some increase from the initial 6 to 10 grams per 100 cc. density is almost unavoidable. One factor which may raise the density of the immediate product tea is the effect of transportation from plant to consumer. The shock to, and vibration of, such product incident to handling will normally raise its density from 1 to 3, usually about 2, grams per 100 cc. To account for this increase, it is therefore most preferred that the tea product to be transported have a density of from 6 to 8 grams per 100 cc.

The immediate product teas produced through the present dehydration of thinner thicknesses of extract film readily meet even this narrower density range. As indicated above, however, tea dried from thicker films is often desirably subjected to comminution to reduce particle size to the customary degree of fineness—viz. that sufficient to pass through a mesh of about number six size.

As might be expected, such comminution also increases the apparent density of the tea product—ordinarily in an amount ranging up to about 3 grams per 100 cc. for lower density flakes and down to almost no change for higher density flakes. Fortuitously, however, the present process permits the production, even by thick film dehydration, of such immediate low density flakes as will allow receipt by the eventual consumer of tea having the desired 9 to 12 grams per 100 cc. density. Accordingly—and in contrast to the usual prior art difficulties respecting the production of a sufficiently low density dried tea—the present invention permits the production of virtually any desired low density product—i.e. less than 12 grams per 100 cc.—and thus provides all the major objectives for a reconstitutable, dried tea.

The invention is further illustrated by the following examples in which the concentrations and percentages are expressed on a weight basis unless otherwise indicated.

EXAMPLE NO. 1

A double drum, trough feed vacuum drier providing a total drying surface area of 1800 sq. cm. (each drum having a length of about 20 cm. and a diameter of about 15 cm.), is utilized to assess the effect of different total solids concentration in the feed tea extract. The drums are hollow and heated through injection of steam at 100°C. In three separate runs under the conditions set forth in the table below, the product moisture is maintained at close to constant value by adjusting the residence time and vacuum.

| Solids Concentration | Product Moisture | Film Thickness | Temperature | Residence Time | Vacuum (Tor) | Apparent Density (g/100 cc.) |
|---|---|---|---|---|---|---|
| 42.0% | 2.7% | .063 cm. | 100°C | 50 sec. | 10 | 10.0 |
| 45.5% | 2.5% | .063 cm. | 100°C | 62 sec. | 5 | 7.1 |
| 52.2% | 2.7% | .063 cm. | 100°C | 56 sec. | 5 | 6.0 |

As appears from the table above, by varying the tea concentration within the scope of the conditions set forth herein a particularly desired density will result.

EXAMPLE NO. 2

Utilizing the apparatus of Example No. 1, three runs are performed in which the drying temperature (i.e., the temperature of injected steam) is varied while maintaining an apparent or bulk density within the desired parameters. The results of such runs are:

| Temperature | Apparent Density (g/100 cc.) | Residence Time | Film Thickness | Vacuum (Tor) | Solids Concentration | Product Moisture |
|---|---|---|---|---|---|---|
| 100°C | 7.2 | 95 sec. | .063 cm. | 5 | 47% | 2.2% |
| 89°C | 9.2 | 95 sec. | .063 cm. | 5 | 47% | 3.2% |
| 78°C | 9.2 | 95 sec. | .063 cm. | 5 | 47% | 4.5% |

As evidenced by the above runs, the moisture content of the dried product is highly dependent upon the temperature of drying.

EXAMPLE NO. 3

Utilizing the apparatus of Example No. 1, the effect of residence time on powder density and moisture is investigated by maintaining the remaining parameters essentially constant. Four runs are performed as follows:

| Residence Time | Film Thickness | Vacuum (Tor) | Temperature | Solids Concentration | Apparent Density (g/100 cc.) | Product Moisture |
|---|---|---|---|---|---|---|
| 95 sec. | .063 cm. | 5 | 99°C | 48.3% | 7.0 | 2.0% |
| 62 sec. | .063 cm. | 5 | 100°C | 48.3% | 7.0 | 3.3% |
| 50 sec. | .063 cm. | 5 | 99°C | 48.3% | 7.0 | 4.1% |
| 38 sec. | .063 cm. | 5 | 101°C | 48.3% | 14.0 | 7.2% |

As is evidenced by the above-indicated data, both moisture content and the density of the product powders vary with the residence period of the film on the drum, and for any given thickness, an optimum period can be determined.

EXAMPLE NO. 4

Utilizing the apparatus of Example No. 1, the effect of film thickness on product characteristics is investigated by maintaining residence time, solids concentration and moisture content essentially constant. The results of such runs are as follows:

| Film Thickness | Product Moisture | Residence Time | Solids Concentration | Vacuum (Tor) | Temperature | Apparent Density (g/100 cc.) |
|---|---|---|---|---|---|---|
| .036 cm. | 2.2% | 90 sec. | 45% | 12 | 89°C | 20.0 |
| .045 cm. | 2.6% | 90 sec. | 43% | 12 | 86°C | 10.0 |

As evidenced by the foregoing data, the density of the dried product is directly related to the film thickness of the extract subjected to dehydration.

EXAMPLE NO. 5

Utilizing a double drum, trough feed vacuum drier providing a total drum surface area of 3.4 sq. meters (each drum having a diameter of about 0.6 meter and a length of about 0.9 meter), tea extract having a solids concentration of 48.7% was dried at a residence time of 46 seconds, a vacuum of 10 Tor, a film thickness of 0.008 cm. and a temperature of 103°C. The resultant product had a moisture content of 3.2% and a density of 9.5 grams per 100 cc. The physical appearance of the product revealed light brown flakes characterized by a vitreous and highly glossy sheen of a size immediately useful as an instant tea product. Upon reconstitution of the product in hot water to normal beverage concentration, a highly desirable reddish-orange appearance was evident.

EXAMPLE NO. 6

An additional run on the apparatus of Example No. 5 is performed utilizing an extract having a solids concentration of 47.1 with a residence time of 59 seconds, a vacuum of 12 Tor, a film thickness of 0.008 cm. and a steam temperature of 103°C. The resultant product had a moisture content of 3.0, density of 8.4 grams per 100 cc. and was otherwise indistinguishable in appearance from the product of Example No. 5.

EXAMPLE NO. 7

A continuous run of 12 hours duration is performed utilizing the apparatus of Example 5. At the end of each hour, the conditions of processing and some product characteristic are measured. This data is as follows:

| Solids Concentration | Temperature | Residence Time | Film Thickness | Vacuum (Tor) | Apparent Density (g/100 cc.) | Product Moisture |
|---|---|---|---|---|---|---|
| 46.5 | 110°C | 66 sec. | .045 cm. | 4.5 | * | 3.0% |
| 46.5 | 110°C | 66 sec. | .045 cm. | 5.2 | 7.0 | 3.0% |
| 46.5 | 110°C | 66 sec. | .045 cm. | 5.5 | * | * |
| 46.5 | 110°C | 66 sec. | .045 cm. | 6.0 | 7.5 | 3.1% |
| 46.5 | 111°C | 66 sec. | .045 cm. | 4.5 | * | * |
| 46.0 | 110°C | 66 sec. | .045 cm. | 5.0 | 10.0 | 2.0% |
| 46.0 | 110°C | 54 sec. | .045 cm. | 4.0 | 6.0 | 3.0% |
| 48.7 | 110°C | 54 sec. | .045 cm. | 5.5 | 7.5 | 3.1% |
| 48.7 | 110°C | 54 sec. | .045 cm. | 5.0 | 5.5 | 3.4% |
| 52.0 | 109°C | 63 sec. | .045 cm. | 6.5 | 5.0 | 2.8% |
| 52.0 | 110°C | 63 sec. | .045 cm. | 6.0 | 5.5 | 3.3% |

* Not Determined

Because the dark brown flakes are somewhat larger in size than desired, the product is gently grated on a screen of 6 mesh size. This step allows separation of a dried tea retaining its initial glossy sheen and vitreous appearance but exhibiting an average apparent density of 7.7 grams per 100 cc. Upon reconstitution to hot beverage form, a highly desirable reddish-orange hue is evident.

EXAMPLE NO. 8

Samples of the dried tea product resultant from Example 5 and from the second hour's run of Example 7, as well as equal weights of spray-dried and freeze-dried samples are reconstituted to produce tea beverages. Each of these dried samples was obtained from the same initial tea extract, an aliquot of which is also diluted with water to produce an equivalent beverage. All five beverages are then served to a blind panel of seven expert tea tasters.

The seven tasters then each idependently evaluate the five beverages, grading them from 1 to 5 in order of preference, respectively. The results of such grading are as follows:

| BEVERAGES | TASTERS | | | | | | | RESULTS |
|---|---|---|---|---|---|---|---|---|
| | 1st | 2nd | 3rd | 4th | 5th | 6th | 7th | Total |
| Example 5 | 2 | 3 | 3 | 3 | 3 | 2 | 3 | 19 |
| Example 7 | 3 | 2 | 2 | 2 | 2 | 3 | 4 | 15 |
| Extract | 1 | 1 | 1 | 1 | 1 | 1 | 1 | 7 |
| Spray-dried | 5 | 5 | 5 | 5 | 5 | 4 | 5 | 34 |
| Freeze-dried | 4 | 4 | 4 | 4 | 4 | 5 | 2 | 27 |

The data shows that, of those beverages reconstituted from dried tea products, the vacuum drum dried products of the present invention are clearly superior to products produced in accordance with the prior art techniques of spray and/or freeze drying. Only the sample of original extract—which had not been subjected to drying—provided a taste deemed superior to that of beverages reconstituted from the products of this invention.

We claim:

1. A process for dehydrating an aqueous extract of tea leaves having a concentration of from 40 to 55% by weight of solids comprising applying a film of said extract in a thickness of between 0.035 and 0.065 centimeters on the external surface of a rotating drum, maintaining the internal temperature of said drum in a range of from 95° to 125°C, evaporating water from said film under a condition of vacuum of from 3 to 15 Tor. for a residence time of from 10 to 150 seconds until the total moisture content of the extract is in the range between 2 to 4%, and then subjecting the dried film to a shearing force to remove the dried extract from the surface of said drum as flakes having an apparent density of less than 12 grams per 100 cc.

2. The process of claim 1 in which said aqueous extract is applied to the external surface of each of a pair of parallel disposed counter-rotating drums, spaced such as to provide a nip therebetween by confining a pool of said aqueous extract at said nip and spacing the drums such that the dimension of the nip therebetween is twice the film thickness to be applied to each drum surface.

3. The process of claim 1 in which the film of aqueous extract is applied to said drum surface in a spraying operation.

4. The process of claim 3 in which the aqueous extract is sprayed onto said drum surface as a film thicker than that desired, said thicker film being subjected to a doctoring operation to reduce it to the desired thickness.

5. The process of claim 1 in which the internal temperature of said drum is maintained in a range of from 100 to 115°C.

6. The process of claim 1 in which water is evaporated from said film for a residence time of from 10 to 100 seconds.

7. The process of claim 1 in which the internal temperature of said drum is maintained by flowing steam into said drum.

8. The process of claim 1 in which said aqueous extract has a concentration of from 45 to 50% by weight of solids.

9. The process of claim 1 in which the dried film is subjected to shearing force by positioning a scraper adjacent the surface of said drum at a location in which said dried film engages with said scraper.

10. The process of claim 1 wherein water is evaporated from the said film for a residence time of from 40 to 100 seconds, under a condition of vacuum of from 3 to 10 Tor.

11. The process of claim 1 in which the aqueous extract applied to the surface of the drum has a temperature of from 20° to 30°C.

12. The process of claim 10, in which the flakes sheared from the drum are comminuted to produce flakes having an apparent density of from 6 to 10 grams per 100 cc.

13. The product produced by the process of claim 1.

* * * * *

UNITED STATES PATENT OFFICE
CERTIFICATE OF CORRECTION

PATENT NO. : 3,976,804
DATED : August 24, 1976
INVENTOR(S) : Rupert J. Gasser and James G. Franklin It is certified that error appears in the above-identified patent and that said Letters Patent are hereby corrected as shown below:

Col. 4, line 56, "or" should read --of--.

Col. 6, line 23, "1000 Tor" should read --100 Tor--.

Col. 11, line 29, (Claim 1), "400" should read --40--.

Signed and Sealed this

Sixth Day of February 1979

[SEAL]

Attest:

RUTH C. MASON
Attesting Officer

DONALD W. BANNER
Commissioner of Patents and Trademarks